United States Patent [19]
Kuromitsu et al.

[11] Patent Number: 5,673,979
[45] Date of Patent: Oct. 7, 1997

[54] HYDRAULIC BRAKING PRESSURE CONTROL APPARATUS FOR AUTOMOTIVE VEHICLE

[75] Inventors: Hiromu Kuromitsu; Masashi Sawada, both of Chiryu, Japan

[73] Assignee: Aisin Seiki Kabushiki Kaisha, Kariya, Japan

[21] Appl. No.: 655,432

[22] Filed: May 30, 1996

[30] Foreign Application Priority Data

| Jun. 1, 1995 | [JP] | Japan | 7-135426 |
| Jan. 30, 1996 | [JP] | Japan | 8-014617 |
| Feb. 13, 1996 | [JP] | Japan | 8-025441 |

[51] Int. Cl.$^6$ .................................... B60T 8/32
[52] U.S. Cl. .................. 303/116.1; 303/119.1; 303/900; 303/119.2
[58] Field of Search .................. 303/119.2, 119.1, 303/900, 901, 116.1, 116.2, 116.3, 116.4, 115.5, 115.4, 113.1, 113.2, DIG. 1, DIG. 2, 113.5, 189, 187, 188, 186; 137/596.17; 251/129.15

[56] References Cited

U.S. PATENT DOCUMENTS

| 3,866,983 | 2/1975 | Kondo | 303/900 |
| 4,636,009 | 1/1987 | Tsuru et al. | 303/116.1 |
| 4,640,558 | 2/1987 | Nomura et al. | 303/900 |
| 4,715,667 | 12/1987 | Otsuki et al. | 303/116.1 |
| 4,800,289 | 1/1989 | Adachi et al. | 303/900 |
| 4,844,558 | 7/1989 | Ishii et al. | 303/116.1 |
| 4,892,362 | 1/1990 | Takata | 303/900 |
| 4,952,002 | 8/1990 | Arikawa et al. | 303/116.1 |
| 4,957,330 | 9/1990 | Morikawa et al. | 303/900 |
| 5,015,045 | 5/1991 | Nishii | 303/900 |
| 5,065,573 | 11/1991 | Nomura et al. | 303/116.1 |
| 5,156,448 | 10/1992 | Kirstein | 303/119.1 |
| 5,167,443 | 12/1992 | Kervagoret | 303/116.1 |
| 5,265,948 | 11/1993 | Holzmann et al. | 303/900 |
| 5,267,782 | 12/1993 | Engfer | 303/900 |
| 5,441,336 | 8/1995 | Takeuchi | 303/900 |
| 5,531,514 | 7/1996 | Nishii et al. | 303/119.1 |
| 5,540,488 | 7/1996 | Terazawa et al. | 303/119.1 |
| 5,584,540 | 12/1996 | Takeuchi et al. | 303/900 |
| 5,620,238 | 4/1997 | Takeuchi | 303/900 |

FOREIGN PATENT DOCUMENTS

| 6-171487 | 6/1994 | Japan . |
| 7-2074 | 1/1995 | Japan . |

*Primary Examiner*—Douglas C. Butler
*Attorney, Agent, or Firm*—Burns, Doane, Swecker & Mathis, LLP

[57] ABSTRACT

A hydraulic braking pressure control apparatus adapted to a vehicle braking system for a set of wheel brake cylinders, which includes an electric operated valve assembly provided to control hydraulic braking fluid under pressure supplied from a master cylinder to the wheel brake cylinders and an electrically operated fluid pump cooperable with the valve assembly to recirculate hydraulic fluid from each of the wheel brake cylinders into a fluid reservoir of the master cylinder when a set of road wheels of the vehicle tend to be locked in braking operation. The valve assembly is constructed to restrict recirculation of hydraulic fluid from either one of the wheel brake cylinders when the hydraulic pressure in the other wheel brake cylinder is decreased by operation of the fluid pump.

8 Claims, 10 Drawing Sheets

HYDRAULIC BRAKING PRESSURE CONTROL APPARATUS FOR AUTOMOTIVE VEHICLE

BACKGROUND OF THE INVENTION

1. Field of the Invention

The present invention relates to a hydraulic braking pressure control apparatus adapted for use in a vehicle braking system, and more particularly to an improvement of a hydraulic braking pressure control apparatus, for example, associated with an anti-skid apparatus of an automotive vehicle.

2. Description of the Prior Art

Disclosed in Japanese Patent Laid-open Publication 6(1994)-171487 is a hydraulic braking pressure control apparatus adapted to a vehicle braking system for a set of wheel brake cylinders which includes an electrically operated valve assembly provided to control hydraulic braking fluid under pressure from a master cylinder to the wheel brake cylinders and an electrically operated fluid pump arranged to recirculate the hydraulic braking fluid from the wheel brake cylinders into a fluid reservoir of the master cylinder when a set of road wheels of the vehicle tend to be locked in braking operation.

In the conventional anti-skid apparatus, the electrically operated valve assembly is composed of a set of electromagnetic on-off valves, and an orifice is disposed in each fluid passage connecting the wheel brake cylinders to the suction side of the fluid pump. If in operation, there is a large difference in coefficient of friction on a travel road between the road wheels of the vehicle, the on-off valves are controlled to increase the hydraulic pressure in the wheel brake cylinder at a high frictional coefficient side and to decrease the hydraulic pressure in the wheel brake cylinder at a low frictional coefficient side. In such control of the on-off valves, the amount of hydraulic fluid recirculated into the fluid pump from the former wheel brake cylinder increases due to an increase of the hydraulic pressure in the latter wheel brake cylinder. As a result, the hydraulic pressure in the latter wheel brake cylinder may not be efficiently decreased by operation of the fluid pump.

Disclosed in Japanese Patent Laid-open Publication No. 7(1995)-2074 is a hydraulic braking pressure control apparatus which includes an electromagnetic valve assembly composed of an electromagnetic motor and two valves arranged to be moved by the electromagnetic motor, the two valves being disposed within each fluid passage connecting a master cylinder to the wheel brake cylinders of the vehicle and also includes an electromagnetic on-off valve disposed within a fluid passage connecting the wheel brake cylinders to an electrically operated fluid pump to control hydraulic braking fluid recirculated from the wheel brake cylinders into a fluid reservoir of the master cylinder by operation of the fluid pump.

Although the latter hydraulic braking pressure control apparatus is useful to solve the foregoing problem in the former control apparatus, it is disadvantageous that the electromagnetic vale assembly is large in size and the provision of the electromagnetic valve assembly for each of the wheel brake cylinders results in an increase of the manufacturing cost.

SUMMARY OF THE INVENTION

It is, therefore, a primary object of the present invention to provide a hydraulic brake pressure control apparatus capable of restricting recirculation of the hydraulic braking fluid from either one of a set of wheel brake cylinders when the hydraulic pressure in the other wheel brake cylinder is decreased by operation of the fluid pump in a simple construction at a low cost.

According to the present invention, the object is accomplished by providing a hydraulic braking pressure control apparatus adapted to a vehicle braking system for a set of wheel brake cylinders in an automotive vehicle, which includes an electrically operated valve assembly provided to control hydraulic braking fluid under pressure from a master cylinder to the wheel brake cylinders and an electrically operated fluid pump arranged to recirculate the hydraulic braking fluid from the wheel brake cylinders to a fluid reservoir of the master cylinder when a set of road wheels of the vehicle tend to be locked in braking operation, wherein the hydraulic braking pressure control apparatus comprises a first fluid passage connecting the master cylinder to each of the wheel brake cylinders to permit the flow of hydraulic braking fluid under pressure supplied to the respective wheel brake cylinders without causing any throttle of the braking fluid; a second fluid passage connected in parallel with the first fluid passage, the second fluid passage being provided with throttle means; and a third fluid passage connecting each of the wheel brake cylinders to the electrically operated fluid pump; and wherein the electrically operated valve assembly comprises first valve means disposed within the first fluid passage to permit the flow of hydraulic braking fluid under pressure passing therethrough when it is retained in a first position and to connect the first fluid passage to the second fluid passage when it is switched over from the first position to a second position; second valve means disposed within the second fluid passage to cooperate with the first valve means, the second valve means being normally retained in an open position in a condition where the first valve means is retained in the first position and being arranged to be closed by energization of an electromagnetic motor assembled therewith for switching over the first valve means from the first position to the second position so that the first valve means is retained in the second position by a difference in pressure between opposite sides of the throttle means when the second valve means has been opened by deenergization of the electromagnetic motor; and third valve means disposed within the third fluid passage, the third valve means being normally retained in an open position in a condition where the first valve means is retained in the first position during deactivation of the fluid pump and being arranged to be closed by the difference in pressure between the opposite sides of the throttle means when the second valve means has been opened in a condition where the first valve means is being retained in the second position and to be opened when the first valve means is in the first position during deactivation of the fluid pump.

According to an aspect of the present invention, second throttle means is disposed in addition to the first-named throttle means within the second fluid passage at a downstream side of the second valve means so that the first valve means is retained in the second position when a difference in pressure between opposite sides of the first named throttle means becomes larger than a first predetermined value and that the third valve means is closed when a difference in pressure between opposite sides of the second throttle means becomes a larger than a second predetermined value. Preferably, the second throttle means is disposed within the second fluid passage at a downstream side of the first-named throttle means.

According to another aspect of the present invention, the first, second and third valve means are coaxially disposed within a single housing body, and the electromagnetic motor is mounted within the housing body coaxially with the first, second and third valve means to cooperate the second valve means with the first valve means. Alternatively, the first and second valve means are coaxially disposed within a first internal bore formed in a single housing body, the electromagnetic motor is mounted within the housing body coaxially with the first and second valve means to cooperate the second valve means with the first valve means, and the third valve means is disposed within a second internal bore formed in parallel with the first internal bore in the housing body to be closed and opened in response to on-off operation of the second valve means.

According to a further aspect of the present invention, the hydraulic braking pressure control apparatus further comprises a fourth fluid passage connecting a suction side of the fluid pump to the first fluid passage between the master cylinder and the first valve means, fourth valve means disposed within the first fluid passage to disconnect the fourth fluid passage from the first fluid passage and permit the flow of hydraulic braking fluid supplied therethrough from the master cylinder toward the first valve means when it is retained in a first position during deactivation of the fluid pump and to connect the fourth fluid passage to the first fluid passage when it is switched over from the first position to a second position under an inoperative condition of the master cylinder, and a fifth fluid passage connecting a discharge side of the fluid pump to the first fluid passage between the fourth valve means and the first valve means.

Alternatively, the hydraulic braking pressure control apparatus further comprises a fourth fluid passage connecting a suction side of the fluid pump to the first fluid passage between the master cylinder and the first valve means, fourth valve means disposed within the fourth fluid passage, the fourth valve means being normally retained in a closed position to interrupt the flow of hydraulic fluid passing through the fourth fluid passage and being arranged to be opened when the fluid pump is activated under an inoperative condition of the master cylinder, fifth valve means disposed within the first fluid passage between the master cylinder and the first valve means, the fifth valve means being normally retained in an open position to permit the flow of hydraulic braking fluid passing therethrough and being arranged to be closed when the fluid pump is activated under the inoperative condition of the master cylinder; and a fifth fluid passage connecting a discharge side of the fluid pump to the first fluid passage between the fifth valve means and the first valve means.

According to a still another aspect of the present invention, the hydraulic braking pressure control apparatus further comprises a fourth fluid passage connecting a suction side of the fluid pump to the first fluid passage between the master cylinder and the first valve means, fourth valve means disposed within the fourth fluid passage, the fourth valve means being normally retained in an open position to be closed when the fluid pump is activated under an inoperative condition of the master cylinder; check valve means disposed within the first fluid passage between the master cylinder and the first valve means to permit only the flow of hydraulic braking fluid under pressure supplied from the master cylinder toward the first valve means through the first fluid passage; and a discharge passage connecting the discharge side of the fluid pump to the first fluid passage between the check valve and the first valve means.

BRIEF DESCRIPTION OF THE DRAWINGS

Additional objects, features and advantages of the present invention will be more readily appreciated from the following detailed description of preferred embodiments thereof when taken together with the accompanying drawings, in which.

DESCRIPTION OF THE PREFERRED EMBODIMENTS

Figure 1:
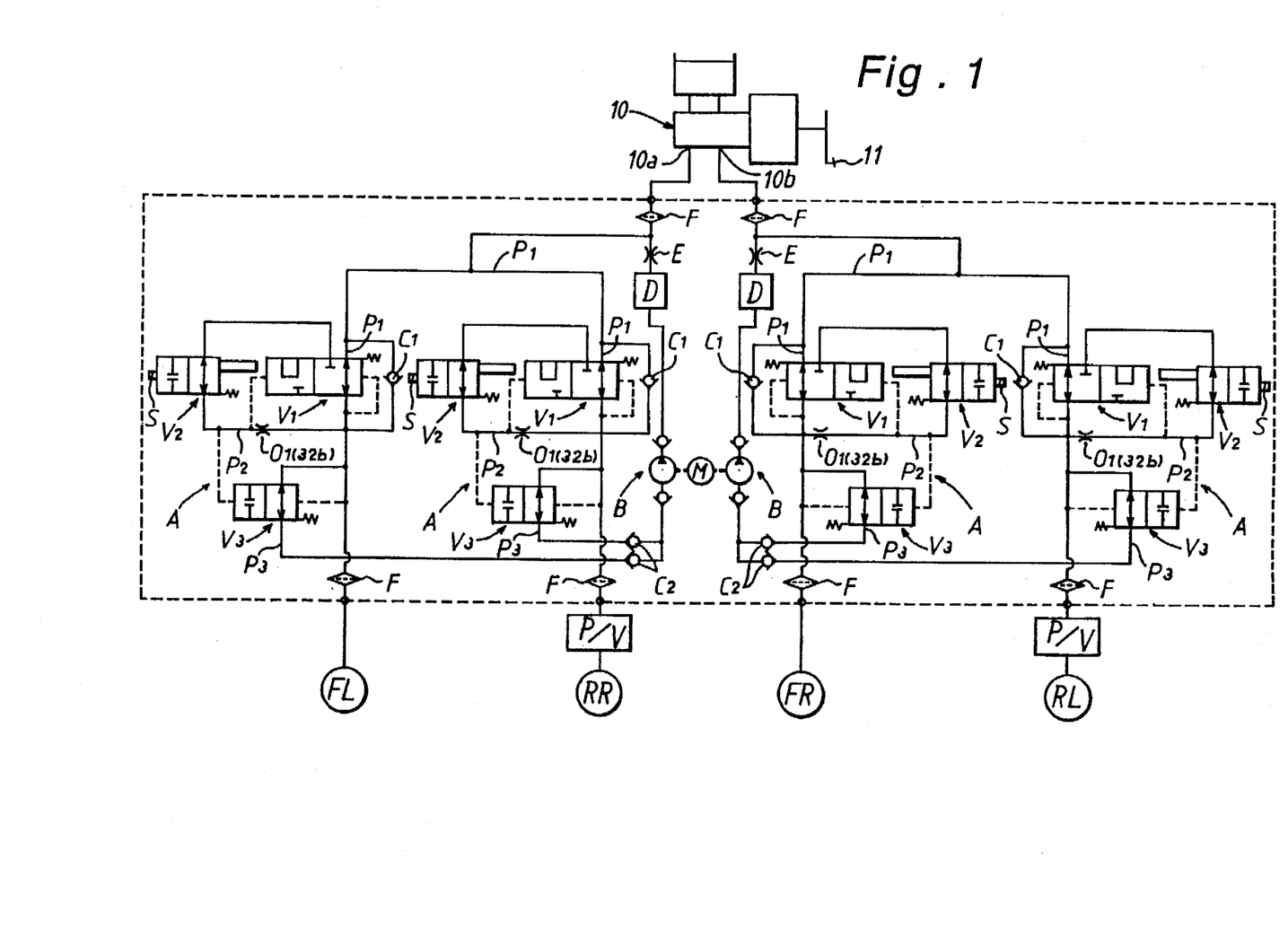
FIG. 1 is a schematic illustration of a hydraulic braking pressure control apparatus associated with an anti-skid apparatus for an automotive vehicle.

Illustrated in FIG. 1 of the drawings is a hydraulic braking pressure control apparatus of the present invention associated with an anti-skid apparatus for an automotive vehicle of the front engine front wheel drive type, wherein a first braking system for a left-hand front wheel brake cylinder FL and a right-hand rear wheel brake cylinder RR is connected to a front pressure chamber 10a of a tandem master cylinder 10 provided with a brake booster to be operated by depression of a brake pedal 11, and wherein a second braking system for a right-hand front wheel brake cylinder FR and a left-hand rear wheel brake cylinder RL is connected to a rear pressure chamber 10b of the master cylinder 10.

The braking systems each include an electromagnetic valve assembly A respectively in connection to the wheel brake cylinders FL, RR and FR, RL, an electrically operated fluid pump B driven by an electric motor M for recirculating hydraulic fluid under pressure respectively from the wheel brake cylinders to a fluid reservoir of the master cylinder 10 to decrease the hydraulic pressure in the wheel brake cylinders, and a check valve $C_1$ arranged in parallel with the electromagnetic valve assembly A to permit the flow of hydraulic fluid from each of the wheel brake cylinders to the master cylinder 10. The fluid pump B is provided at its suction side with a pair of check valves $C_2$ for interrupting a reverse flow of hydraulic fluid toward the wheel brake cylinders and at its discharge side with a damper device D and an orifice E in series for reducing discharge pulsation of the hydraulic fluid. In FIG. 1, the reference character F indicates each filter provided in the braking systems, and the reference character P/V indicates each conventional proportioning valve provided in the braking systems.

Figure 2:
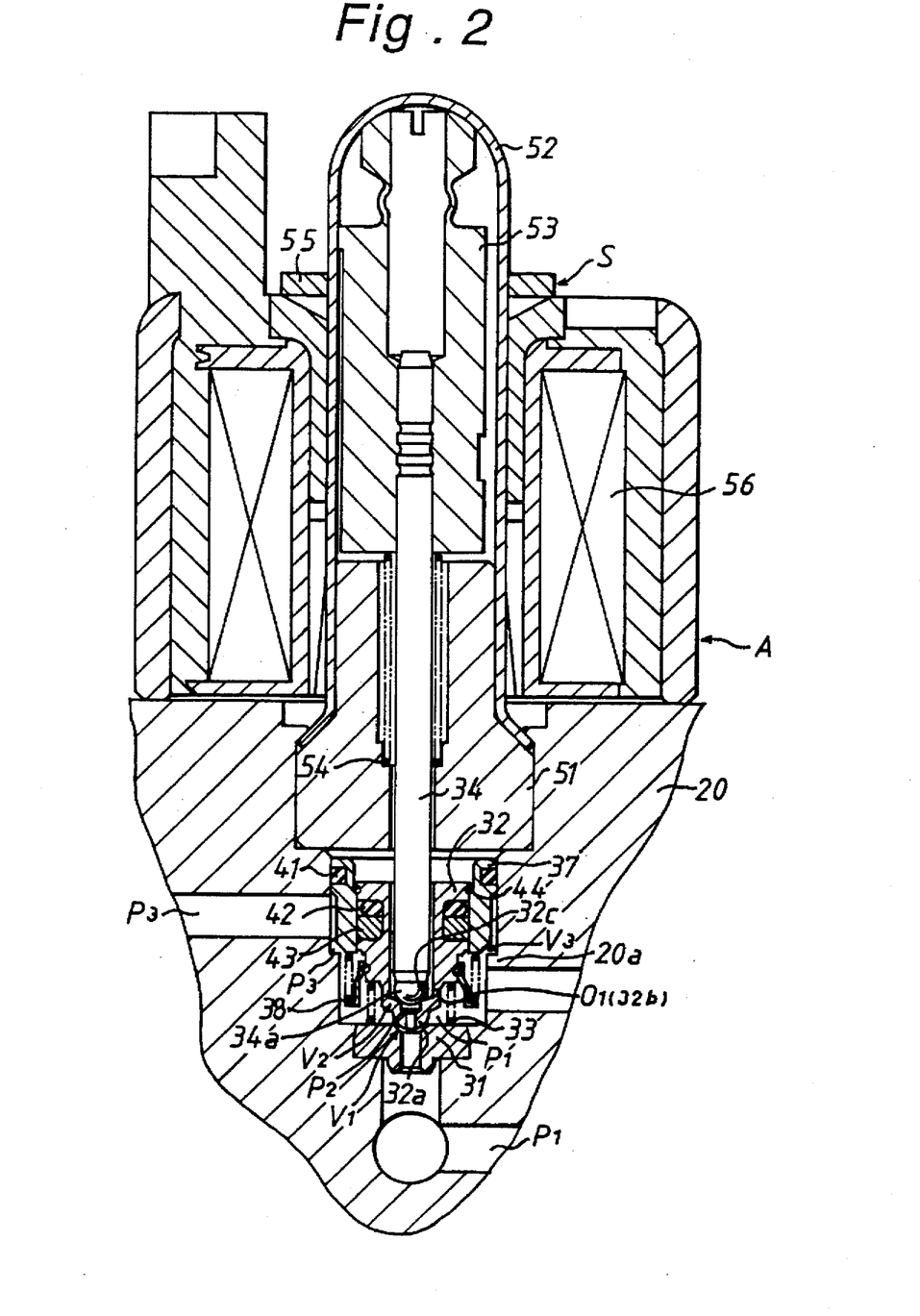
FIG. 2 is a sectional view of an electromagnetic valve assembly shown in FIG. 1.

The electromagnetic valve assembly A is arranged to cooperate with the fluid pump B for adjusting the hydraulic pressure in the respective wheel brake cylinders FL, RR; FR, RL. The electromagnetic valve assembly A includes a first valve $V_1$ in the form of a changeover valve disposed within each first fluid passage $P_1$ connecting the wheel brake cylinders FL, RR; FR, RL to the pressure chambers 10a, 10b of the master cylinder 10, the first valve $V_1$ being normally retained in a first position to permit the flow of hydraulic braking fluid under pressure supplied to the wheel brake cylinder through the first fluid passage $P_1$, a second valve $V_2$ in the form of an electrically operated on-off valve of the normally open type disposed within a second fluid passage $P_2$ connected to the first fluid passage $P_1$ in parallel therewith to cooperate with the first valve $V_1$, a third valve $V_3$ in the form of an on-off valve of the normally open type disposed within a third fluid passage $P_3$ connecting each of the wheel brake cylinders FL, RR; FR, RL to a suction side of the fluid pump B through a portion of the first fluid passage $P_1$ and an electromagnetic motor S assembled with the second valve $V_2$ to open and close the second valve $V_2$ in response to an electric control signal applied from an electric control apparatus (not shown). As shown in FIG. 2, the first, second and third valves $V_1$, $V_2$ and $V_3$ are assembled within a single housing body 20 coaxially with the electromagnetic motor S.

The first valve $V_1$ is composed of a valve seat 31 fixed in place within a stepped bore in the housing body 20, a hollow valve body 32 formed with a spherical valve part 32a engageable with the valve seat 31 and an orifice $O_1$ in the form of a radial throttle hole 32b, and a compression coil spring 33 for biasing the valve body 32 in a direction apart from the valve seat 31. When the valve body 32 is moved against the biasing force of coil spring 33 and engaged with the valve seat 31 at its spherical valve part 32a, the first valve $V_1$ is closed to interrupt the flow of hydraulic fluid under pressure passing through the first fluid passage $P_1$.

The second valve $V_2$ is composed of a valve seat 32c formed in the hollow valve body 32 coaxially with the spherical valve part 32a and a spherical valve part 34a formed on the distal end of an axial rod 34 to be engageable with the valve seat 32c. The axial rod 34 is fixed to a movable member 53 of the electromagnetic motor S. When the spherical valve part 34a of axial rod 34 is moved apart from the valve seat 32c, the second valve $V_2$ is opened to permit the flow of hydraulic fluid passing through the second fluid passage $P_2$. When the spherical valve part 34a of axial rod 34 is engaged with the valve seat 32c, the second valve $V_2$ is closed to interrupt the flow of hydraulic fluid passing through the second fluid passage $P_2$.

The third valve $V_3$ is composed of a valve seat 20a formed on an internal annular shoulder of housing body 20, a cylindrical valve body 37 engageable with the valve seat 20a and a compression coil spring 38 for biasing the valve body 37 in a direction apart from the valve seat 20a. When the valve body 37 is moved apart from the valve seat 20a under the load of coil spring 38, the third valve V3 is opened to permit the flow of hydraulic fluid passing through the third fluid passage $P_3$. When the valve body 37 is engaged with the valve seat 20a, the third valve $V_3$ is closed to interrupt the flow of hydraulic fluid passing through the third fluid passage $P_3$. The cylindrical valve body 37 is axially slidably disposed within the stepped bore in housing body 20 through a seal ring 41, and the valve body 32 is axially slidably coupled within the cylindrical valve body 37 through a seal ring 42, a slide ring 43 of synthetic resin and an annular clip 44 to be moved by a difference in pressure between opposite sides of the throttle hole 32b against the biasing force of coil spring 33.

The electromagnetic motor S is composed of a cylindrical stationary member 51 and a bottomed sleeve member 52 coaxially mounted in place within the housing body 20 in a liquid-tight manner, the movable member 53 contained within the sleeve member 52 to be axially movable relative to the stationary member 51, a compression coil spring 54 engaged with the stationary member 51 to bias the movable member 53 in a direction apart from the stationary member 53 and an electromagnetic coil 56 provided in surrounding relationship with the sleeve member 52 and fixed in place by means of a fastening ring 55. When the electromagnetic coil 56 is energized, the movable member 53 and axial rod 34 are moved against the biasing force of coil springs 33 and 54 to bring the valve body 32 in engagement with the valve seats 31.

In this embodiment, the displacement amount of movable member 53 is determined to be larger than the lift amount or displacement amount of the valve body 32 apart from the valve seat 31, and the lift amount of the valve body 37 is determined to be larger than the lift amount of the valve body 32. With such an arrangement of the movable member 53 and valve bodies 32, 37, the valve body 37 is separated from the valve seat 20a in a predetermined distance to open the third valve $V_3$ even when the spherical valve part 32a of valve body 32 is engaged with the valve seat 31. This permits the flow of hydraulic braking fluid passing through the third fluid passage $P_3$ toward the suction side of the fluid pump B.

In a condition where the electromagnetic motor S in each of the electromagnetic valve assemblies A and the fluid pumps B are inoperative, the first valve $V_1$ is retained in the first position to open the first fluid passage $P_1$, and the second and third valves V2, V3 are positioned to open the second and third fluid passages P2 and P3 respectively. Assuming that in such a condition, the master cylinder has been operated by depression of the brake pedal 11, the wheel brake cylinders FL, RR; FR, RL are supplied with hydraulic braking fluid under pressure from the tandem master cylinder 10 through the first fluid passages P1 without causing any throttle of the braking fluid.

When the electromagnetic coil 56 of each of the electromagnetic motors S is energized in response to an electric control signal applied from the electric control apparatus (not shown) to move the movable member 53 toward the stationary member 51 in a condition where the fluid pumps B are still inoperative and where the wheel brake cylinders FL, RR; FR, RL are being supplied with the hydraulic braking fluid under pressure from the master cylinder 10 through the first fluid passages P1, the axial rod 34 is engaged at its spherical valve part 34a with the valve seat 32c to close the second valve V2, and in turn, the valve body 32 is moved by the axial rod 34 toward the valve seat 31 and engaged with the valve seat 31 to switch over the first valve V1 from its first position to its second position. As a result, the first valve V1 connects the first fluid passage P1 to the second fluid passage P2, and the second valve V2 interrupts the supply of hydraulic braking fluid under pressure to the wheel brake cylinders FL, RR; FR, RL. In this instance, the third valve V3 is maintained in its open position since any difference in pressure does not occur between opposite sides of the throttle hole 32b.

In such a condition as described above, the fluid pumps B are activated in response to an electric control signal applied from the electric control apparatus to recirculate the hydraulic braking fluid from the wheel brake cylinders into the master cylinder 10 thereby to decrease the hydraulic pressure in the wheel brake cylinders. This is effective to prevent the road wheels of the vehicle from locking in braking operation. The decrease of hydraulic pressure is stopped by deactivation of the fluid pumps B.

Immediately after deactivation of the fluid pumps B, the electromagnetic coil 56 of each of the electromagnetic motors S is deenergized so that the movable member 53 is moved by the biasing force of coil spring 54 in a direction apart from the stationary member 51 to separate the spherical valve part 34a of axial rod 34 from the valve seat 32c. As a result, the second valve V2 is opened to permit the flow of hydraulic braking fluid under pressure supplied from the master cylinder 10 through the first and second passages P1 and P2. Thus, the orifice O1 in the second fluid passage P2 acts to throttle the hydraulic braking fluid supplied from the master cylinder 10 so as to gradually increase the hydraulic pressure in the wheel brake cylinders FL, RR; FR, RL. Since in this instance, a difference in pressure between the opposite sides of throttle hole 32b becomes more than a predetermined value, the spherical valve part 32a of valve body 32 is retained in engagement with the valve seat 31 to maintain the first valve V1 in its second position, while the valve body 37 is moved against the biasing force of coil spring 38 and brought into engagement with the valve seat 20a to close the third valve V3.

Assuming that in such braking operation as described above, either one of the electromagnetic assemblies A in the first braking system has been controlled to gradually increase the hydraulic pressure in the wheel brake cylinder FL or RR while the other electromagnetic assembly A has been controlled to decrease the hydraulic pressure in the wheel brake cylinder RR or FL, the fluid pump B in the first braking system does not act to suck the hydraulic fluid being increased in pressure from the wheel brake cylinder FL or RR. As a result, the hydraulic pressure in the other wheel brake cylinder RR or FL is efficiently decreased by operation of the fluid pump B.

Figure 3:
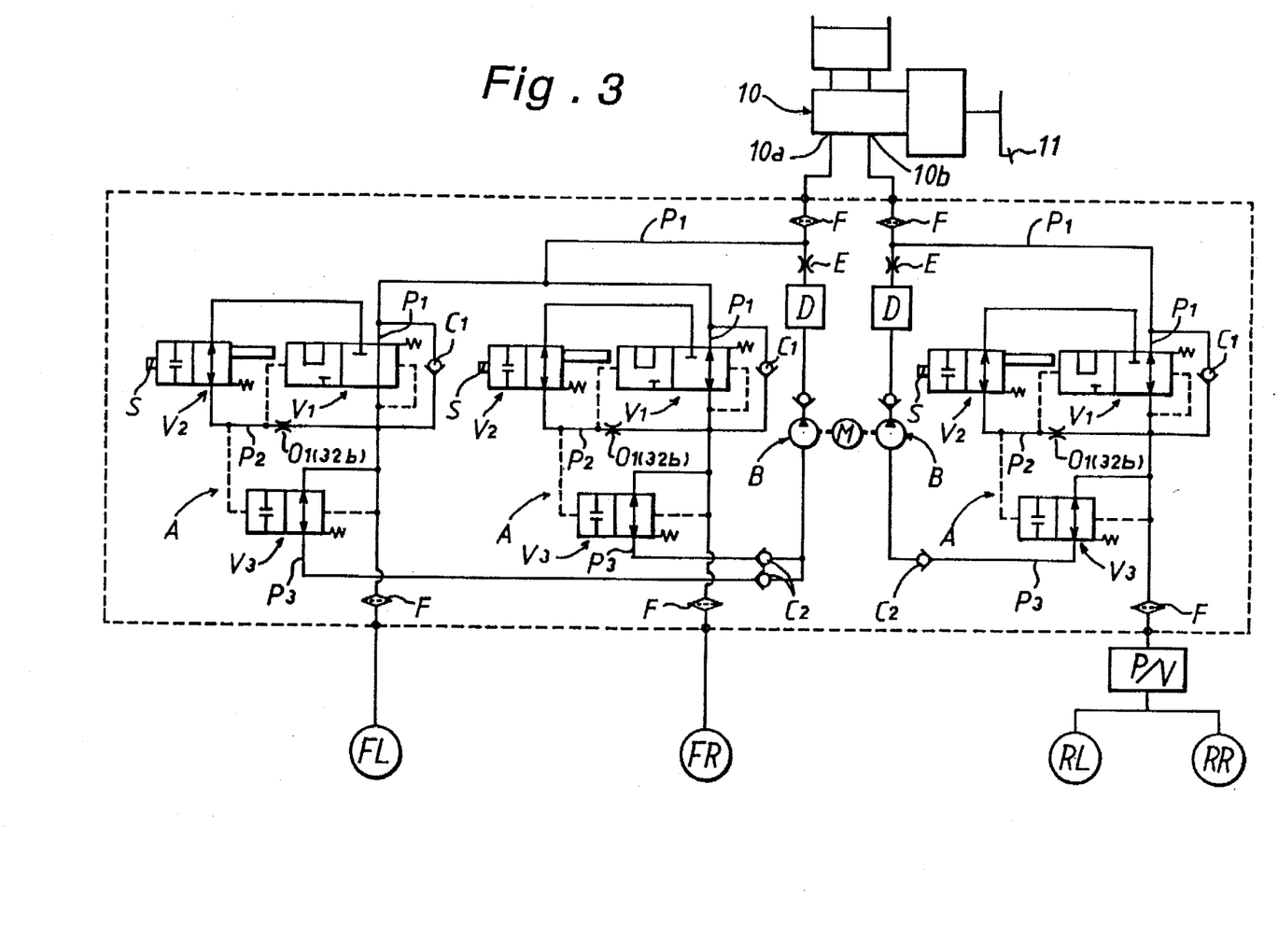
FIG. 3 is a schematic illustration of a modification of the hydraulic braking pressure control apparatus shown in FIG. 1.

Although in the above embodiment, the hydraulic braking pressure control apparatus of the present invention has been associated with the anti-skid apparatus of the automotive vehicle of the front engine front wheel drive type, the hydraulic pressure control device may be associated only with a braking system of front road wheels in an automotive vehicle of the front engine rear wheel drive type as shown in FIG. 3.

Figure 4:
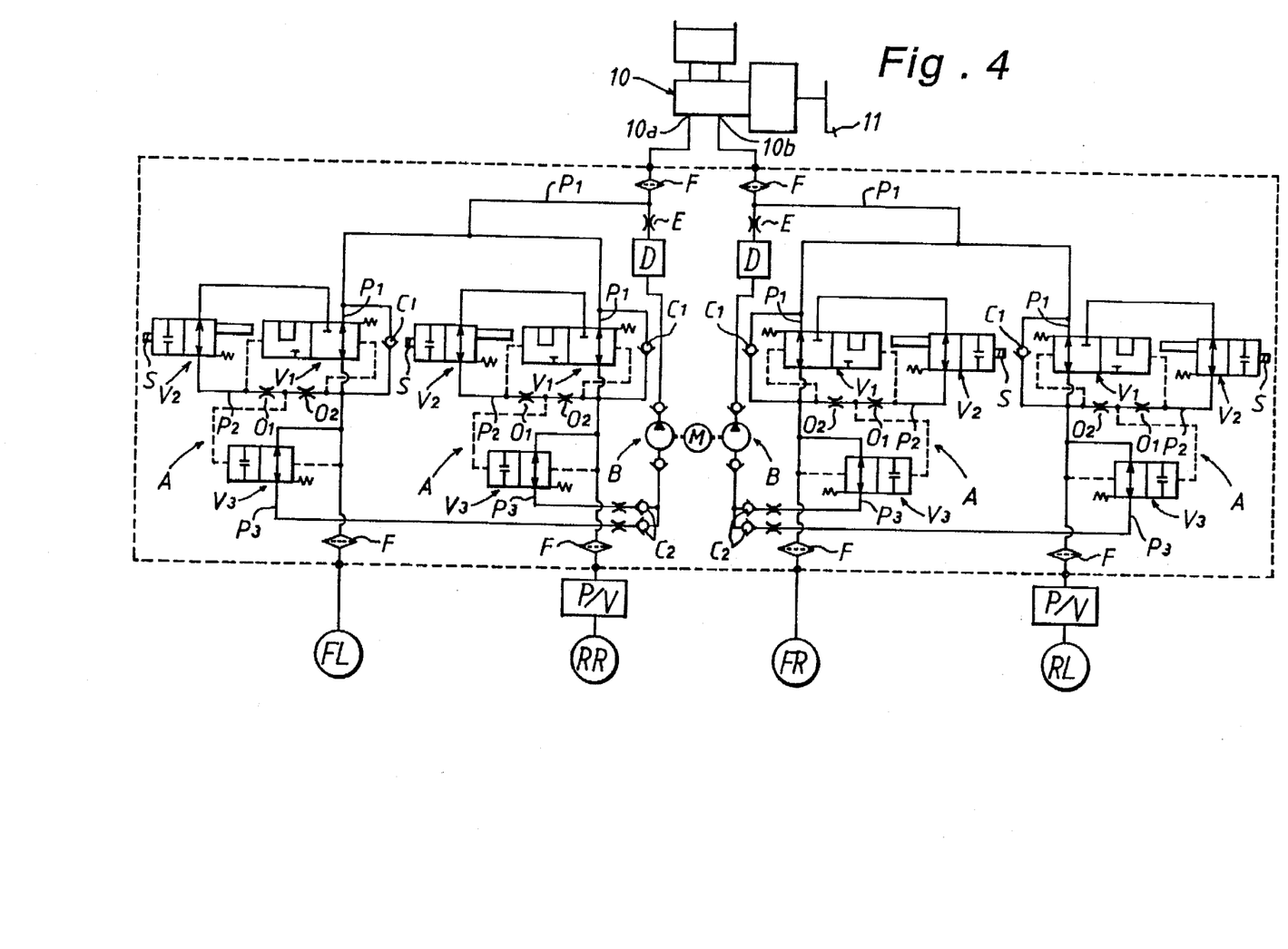
FIG. 4 is a schematic illustration of another modification of the hydraulic braking pressure control apparatus shown in FIG. 1.
Figure 5:
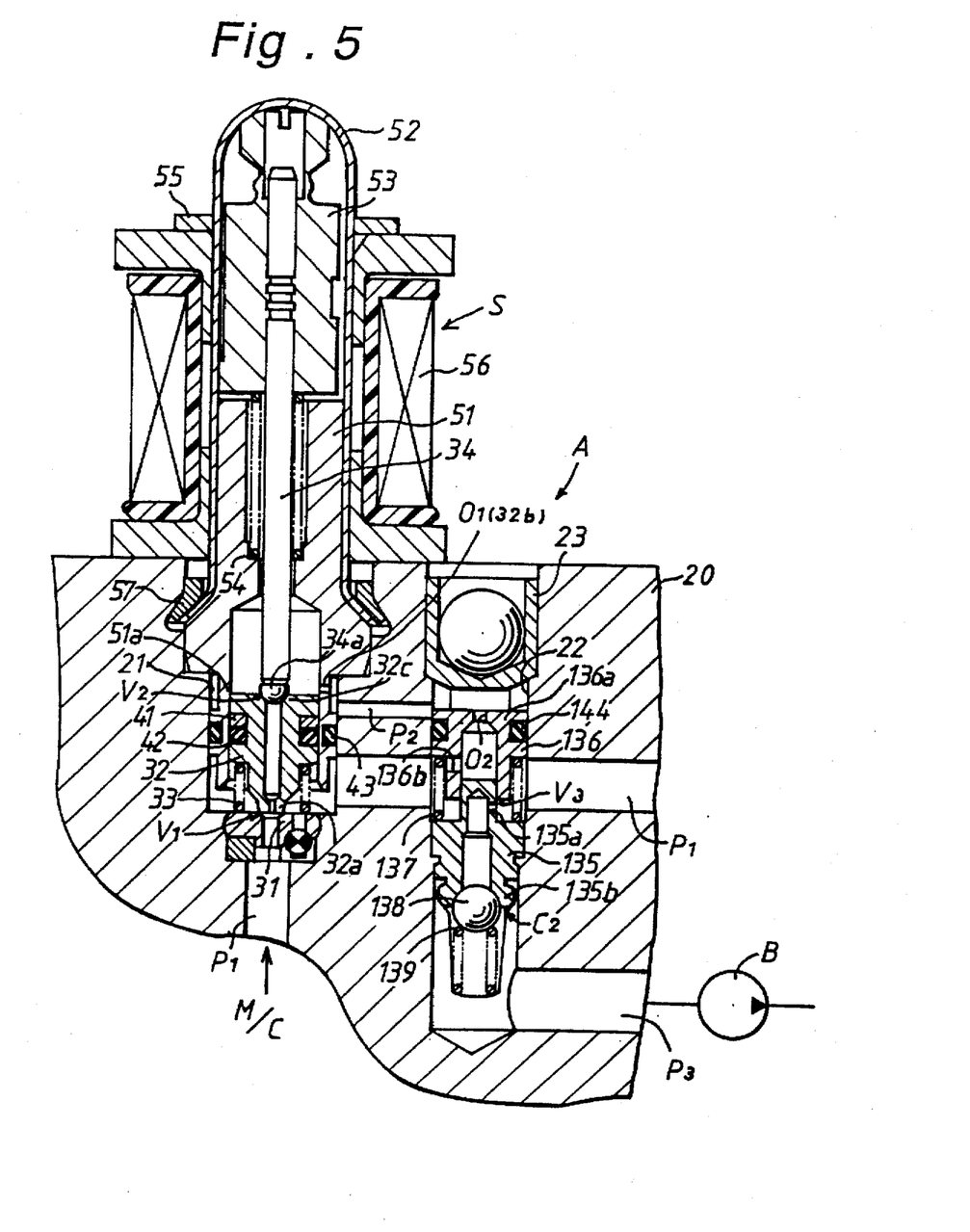
FIG. 5 is a sectional view of an electromagnetic valve assembly shown in FIG. 4.

In FIG. 4, there is illustrated a modification of the hydraulic braking pressure control apparatus shown in FIG. 1, wherein the second fluid passage P2 is provided with a second orifice O2 which is placed at a downstream side of the first orifice O1. In this modification, as shown in FIG. 5, the first and second valves V1 and V2 are coaxially assembled within the housing body 20, and the third valve V3 is assembled in parallel with the first and second valves V1 and V2. In addition, the stationary member 51 and sleeve member 52 are positioned in place by an annular retainer 57, and the stationary member 51 is integrally formed with a cylindrical portion 51a extending downwardly therefrom and coupled within the stepped bore 21 of housing body 20 in a liquid-tight manner. The valve body 32 of first valve V1 is axially slidably disposed within the cylindrical portion 51a of stationary member 51 through the seal ring 41 and slide ring 42, and the first orifice O1 in the second fluid passage P2 is in the form of a radial throttle hole 32b formed in a peripheral wall of the cylindrical portion 51a of stationary member 51. The other construction and parts of the first valve V1 are substantially the same as those of the first valve V1 shown in FIG. 2. The valve seat 32c of the second valve V2 is formed on the upper end of valve body 32 to be engageable with the spherical valve part 34a of axial rod 34. In this modification, the housing body 20 has another stepped bore 22 formed in parallel with the stepped bore 21 and closed by a plug 23 at its outer end.

The third valve V3 is composed of a hollow valve seat member 135 fixed in place within the stepped bore 22 of housing body 20 and formed with a radial hole 135a for providing a communication between the first and third fluid passages P1 and P3, a hollow valve body 136 axially slidably coupled within the stepped bore 22 of housing body 20 through a seal ring 144 to open and close the radial hole 135a, and a compression coil spring 137 engaged at its one end with the valve seat member 135 to bias the valve body 136 in a direction apart from the radial hole 135a of valve seat member 135. The valve body 136 has a bottom formed with the second orifice O2 in the form of an axial hole which is located at the downstream of the first orifice O1. Assuming that in braking operation, the hydraulic fluid under pressure has been supplied from the master cylinder 10 toward the wheel brake cylinders through the second fluid passages P2, the valve body 136 is moved by a difference in pressure between opposite sides of the second orifice O2 against the biasing force of coil spring 137 to close the radial hole 135a. In addition, the valve body 136 is also formed with a radial hole 136b to permit the flow of hydraulic fluid under pressure supplied from the master cylinder 10 to the wheel brake cylinder through the second fluid passage P2 in a condition where the electromagnetic coil 56 is maintained in its deenergized condition to retain the first valve V1 in its second position and to open the second valve V2. The check valve C2 in this modification is provided in the stepped bore 22 coaxially with the third valve V3. The check valve C2 is composed of a valve seat 135b formed on the valve seat member 135, a ball 138 engageable with the valve seat 135b and a compression coil spring 139 engaged at its one end with an internal wall of stepped bore 22 to bias the ball 138 toward the valve seat 135b.

In a condition where the electromagnetic motor S in each of the electromagnetic valve assemblies A and the fluid pumps B are inoperative, the first valve V1 is retained in the first portion, and the second and third valves V2, V3 are positioned to open the second and third fluid passages P2 and P3 respectively. Assuming that in such a condition, the master cylinder 10 has been operated by depression of the brake pedal 11, the wheel brake cylinders FL, RR; FR, RL are supplied with hydraulic braking fluid under pressure from the master cylinder 10 through the first fluid passages P1 without causing any throttle of the braking fluid.

When the electromagnetic coil 56 of each of the electromagnetic motors S is energized to move the movable member 53 toward the stationary member 51 in a condition where the fluid pumps B are still inoperative and where the wheel brake cylinders FL, RR; FR, RL are being supplied with the hydraulic braking fluid from the master cylinder 10 through the first fluid passages P1, the axial rod 34 is engaged at its spherical valve part 34a with the valve seat 32c to close the second valve V2, and in turn, the valve body 32 is moved by the axial rod 34 toward the valve seat 31 against the biasing force of coil spring 33 and engaged with the valve seat 31 to switch over the first valve V1 from its first position to its second position. As a result, the first valve V1 connects the first fluid passage P1 to the second fluid passage P2, and the second valve V2 interrupts the supply of hydraulic braking fluid from the master cylinder 10 to the wheel brake cylinders FL, RR; FR, RL. In this instance, the third valve V3 is still maintained in its open position since any difference in pressure does not occur between opposite sides of the first orifice O1 and between opposite sides of the second orifice O2.

In such a condition as described above, the fluid pumps B are activated in response to an electric control signal from the electric control apparatus to recirculate the hydraulic braking fluid into the master cylinder 10 thereby to decrease the hydraulic pressure in the wheel brake cylinders. This is effective to prevent the road wheels of the vehicle from locking in braking operation. The decrease of hydraulic pressure is stopped by deactivation of the fluid pumps B. Immediately after deactivation of the fluid pumps B, the electromagnetic coil 56 of each of the electromagnetic motors S is deenergized so that the movable member 53 is moved by the biasing force of coil spring 54 in a direction apart from the stationary member 51 to separate the spherical valve part 34a of axial rod 34 from the valve seat 32c. As a result, the second valve V2 is opened to permit the flow of hydraulic braking fluid under pressure supplied from the master cylinder 10 through the first and second passages P1 and P2. In this instance, the first and second orifices O1 and O2 in the second fluid passage P2 act to throttle the hydraulic braking fluid supplied from the master cylinder 10 so as to gradually increase the hydraulic pressure in the wheel brake cylinders FL, RR; FR, RL. Since in this instance, each difference in pressure between the opposite sides of throttles O1 and O2 becomes more than first and second predetermined values respectively, the spherical valve part 32a of valve body 32 is retained in engagement with the valve seat 31 to maintain the first valve V1 in its second position, and the valve body 136 of the third valve V3 closes the radial hole 135a to interrupt the flow of hydraulic braking fluid recirculated through the third fluid passage P3.

Assuming that in such braking operation as described above, either one of the electromagnetic valve assemblies A in the first braking system has been controlled to gradually increase the hydraulic pressure in either one of the wheel brake cylinder FL or RR while the other electromagnetic valve assembly A has been controlled to decrease the hydraulic pressure in the other wheel brake cylinder RR or FL, recirculation of the hydraulic braking fluid from the former wheel brake cylinder FL or RR is restricted by the third valve V3, while the hydraulic pressure in the latter wheel brake cylinder RR or FL is efficiently decreased by operation of the fluid pump B. In actual practices of the present invention, the first and second predetermined values each can be defined as an appropriate value taking into account the braking characteristic of the vehicle.

Figure 6:
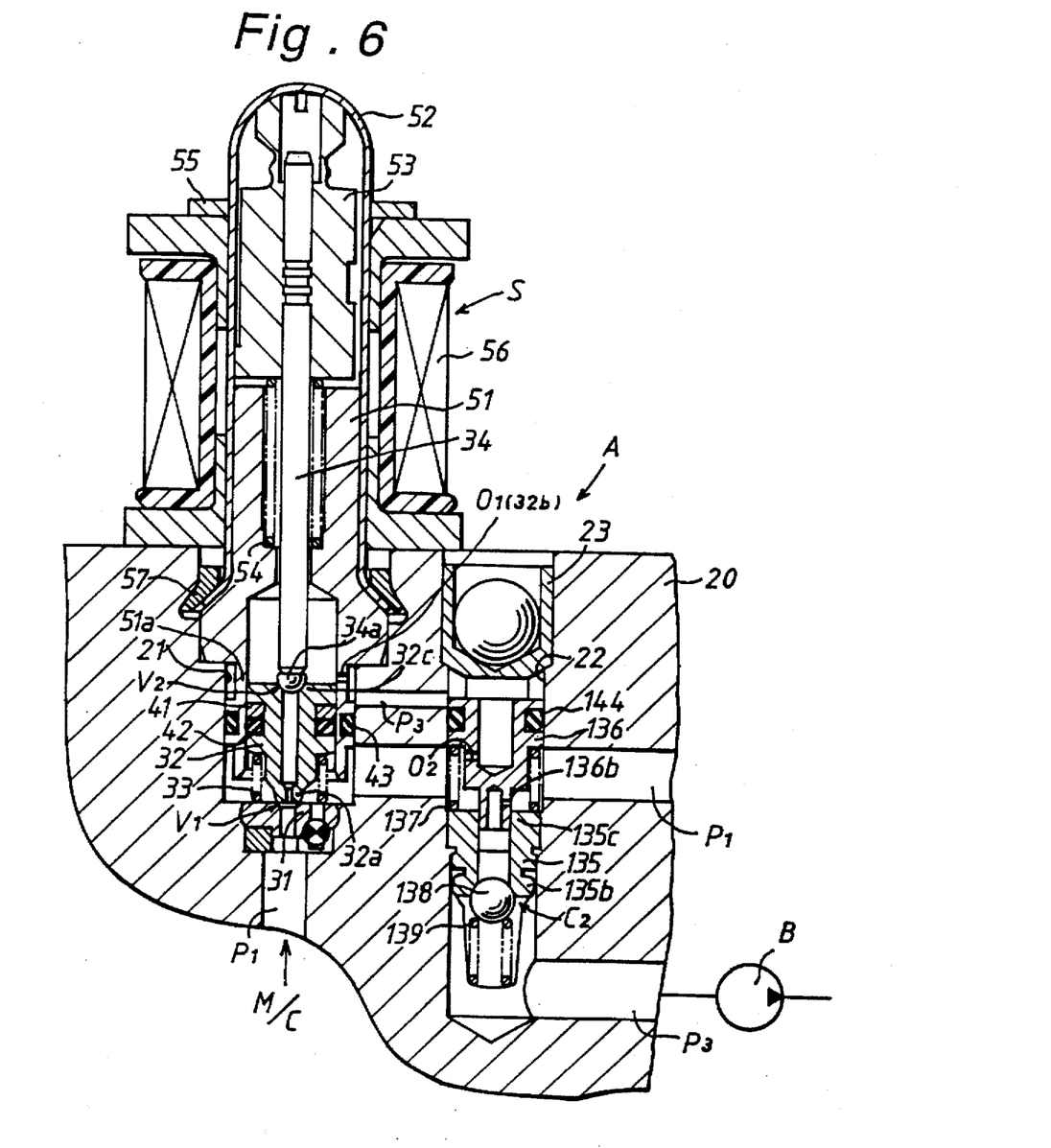
FIG. 6 is a sectional view of a modification of the electromagnetic valve assembly shown in FIG. 5.

Illustrated in FIG. 6 is a modification of the electromagnetic valve assembly A shown in FIG. 5, wherein the valve body 136 is axially slidably coupled within the hollow valve seat member 135. In this modification, the valve body 136 is formed with a radial hole 136b which is closed by engagement with an internal wall 135c of valve seat member 135 when the valve body 136 is moved against the biasing force of coil spring 137, and the second orifice O2 is formed in a peripheral wall of the valve body 136. The other construction and components are substantially the same as those in the electromagnetic valve assembly A shown in FIG. 5.

Figure 7:
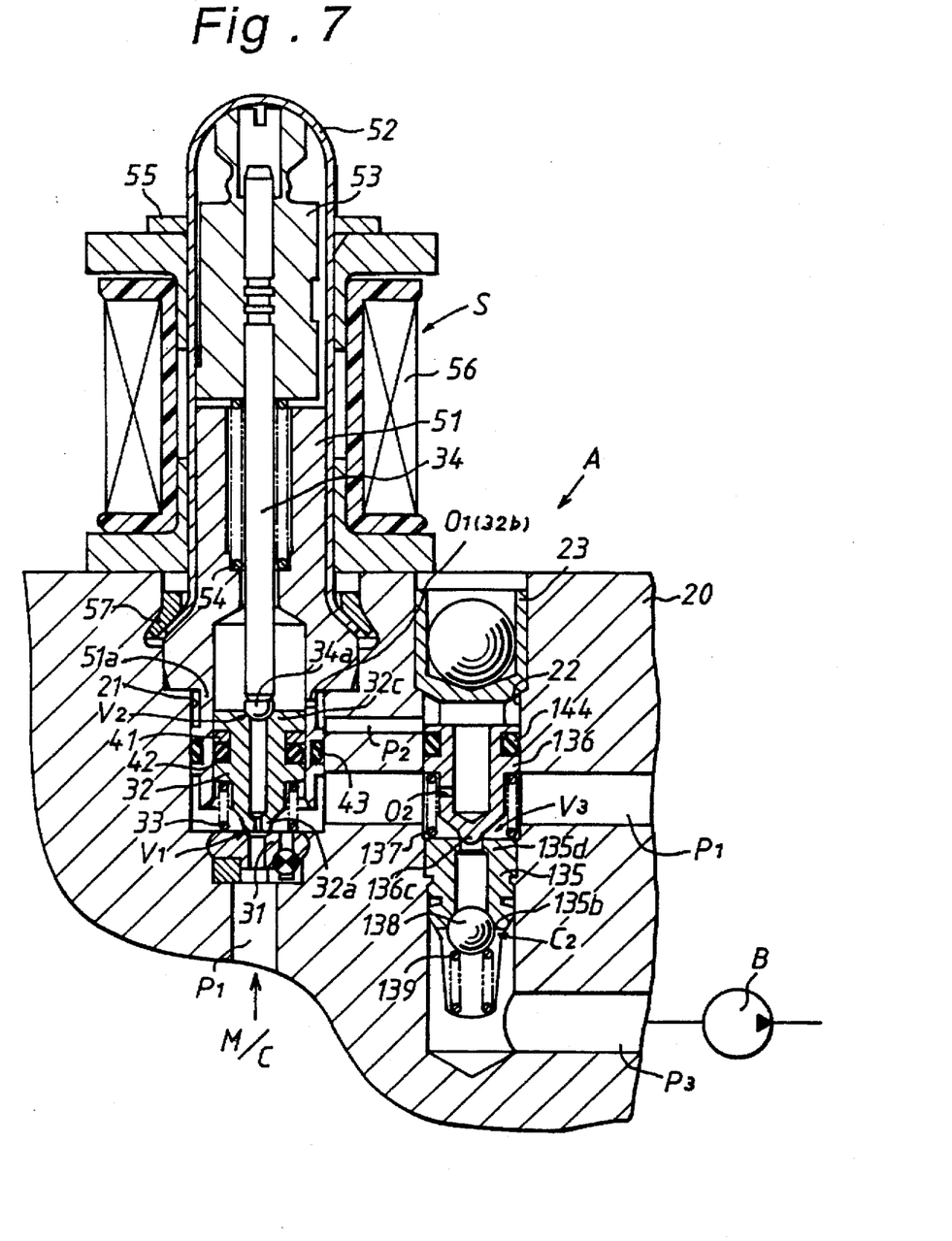
FIG. 7 is a sectional view of another modification of the electromagnetic valve assembly shown in FIG. 5.

Illustrated in FIG. 7 is another modification of the electromagnetic valve assembly A shown in FIG. 5, wherein the valve body 136 is axially slidably coupled within the stepped bore 22 of housing body 20 in a reverse direction. In this modification, the valve seat member 135 is formed with a valve seat 135d coaxial with the second check valve C2, and the valve body 136 is formed with a spherical valve part 136c engageable with the valve seat 135d to provide the third valve V3 in the third fluid passage P3. In addition, the second orifice O2 is formed in a peripheral wall of the valve body 136. The other construction and components are substantially the same as those in the electromagnetic valve assembly A shown in FIG. 5.

Figure 8:
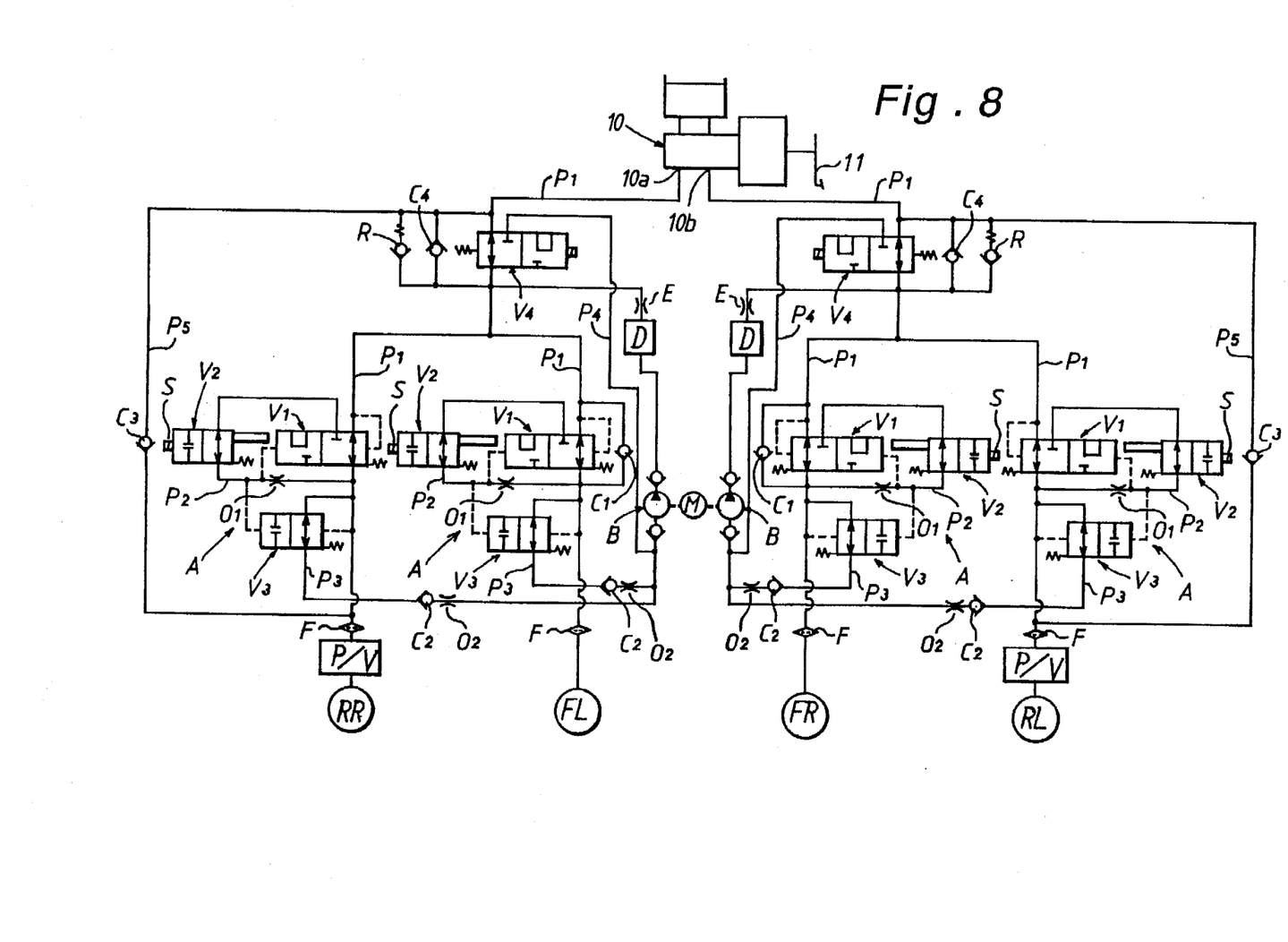
FIGS. 8, 9 and 10 illustrate further modifications of the hydraulic braking pressure control apparatus shown in FIG. 1.

Illustrated in FIG. 8 is a further modification of the hydraulic braking pressure control apparatus shown in FIG. 1, wherein an electrically operated changeover valve V4 is disposed within the first fluid passage P1 between the master cylinder 10 and the first valve V1 in the respective braking systems, and wherein a fourth fluid passage P4 is connected at its one end to the suction side of the fluid pump B and at its other end to the first fluid passage P1 through the changeover valve V4 in the respective braking systems. In this modification, the rear wheel brake cylinders RR and RL are respectively connected to the first fluid passage P1 between the master cylinder 10 and the changeover valve V4 through a return passage P5, the discharge passage of the fluid pump B in the respective braking systems is connected to the return passage P5 through a check valve C4 and a relief valve R, and the third fluid passage P3 in the respective braking systems is provided with the second orifice O2 at the downstream side of the check valve C2 to restrict an amount of hydraulic fluid recirculated into the fluid pump B. The return passages P5 each are provided with a check valve C3 which is provided to interrupt the flow of hydraulic fluid from the master cylinder 10 toward each of the rear wheel brake cylinders at an anti-skid control mode and to permit the flow of hydraulic fluid from each of the rear wheel brake cylinders toward the master cylinder 10 at a traction control mode. The changeover valve V4 is normally retained in a first position to permit the flow of hydraulic braking fluid under pressure supplied from the master cylinder 10 toward the first changeover valve V1. When switched over to a second position, the changeover valve V4 connects the first fluid passage P1 to the fourth fluid passage P4 to permit the flow of hydraulic fluid sucked into the fluid pump B from the reservoir of master cylinder 10. The check valve C4 is arranged to interrupt the flow of hydraulic fluid from the discharge side of fluid pump B toward the fifth fluid passage P5. The relief valve R is arranged to permit the flow of hydraulic fluid discharged from the fluid pump B into the reservoir of the master cylinder 10 when the discharge pressure of fluid pump B becomes higher than an upper limit value.

In braking operation of the vehicle, the changeover valves V4 are retained in their first positions to permit the flow of hydraulic braking fluid under pressure supplied therethrough toward the first valves V1 from the master cylinder so that the hydraulic braking fluid under pressure is supplied to the wheel brake cylinders FL, RR; FR, RL under control of the electromagnetic valve assemblies A in the same manner as in the hydraulic braking pressure control apparatus shown in FIG. 1.

Assuming that the front road wheels tend to slip in rapid starting of the vehicle, each of the changeover valves V4 is switched over from its first position to its second position in response to an electric control signal applied thereto from the electric control apparatus (not shown) to connect the first fluid passages P1 to the fourth fluid passages P4. Simultaneously, the fluid pumps B are activated in response to the electric signal to suck hydraulic fluid under low pressure from the reservoir of the master cylinder through the fourth fluid passages P4 to discharge hydraulic fluid under high pressure into the first fluid passages P1 through the damper devices D and orifices E. Immediately after activation of the fluid pumps B, the electromagnetic motor S of each of the valve assemblies A only in connection to the front wheel brake cylinders FL, FR is activated to close the second valve V2 and to switch over the first valve V1 from its first position to its second position.

Subsequently, immediately after the first changeover valve V1 has been switched over to its second position, the electromagnetic motor S of the valve assembly A is deactivated to open the second valve V2 thereby to permit the flow of hydraulic fluid under high pressure supplied into the wheel brake cylinders FL, FR through the second fluid passage P2. As a result, the first valve V1 is retained in its second position by a difference in pressure between the opposite sides of the orifice O1, and the third valve V3 is closed by the difference in pressure between the opposite sides of the orifice O1 to interrupt the flow of hydraulic fluid recirculated into the fluid pump B through the third fluid passage P3. Thus, the front wheel brake cylinders FL, FR are operated by the hydraulic fluid under high pressure supplied from the fluid pumps B through the first and second fluid passages P1 and P2 to ensure traction of the front road wheels of the vehicle. When slippage of the front road wheels of the vehicle is avoided, the electromagnetic motor S of each of the valve assemblies A is activated in response to an electric control signal from the electric control apparatus to close the second valve V2 and to retain the first valve V1 in its second position. In turn, the third valves V3 are opened to recirculate hydraulic fluid from the front wheel brake cylinders FR, FL into the fluid pumps B through the third fluid passages P3. This results in decrease of the hydraulic pressure in the front wheel brake cylinders FR, FL.

Figure 9:
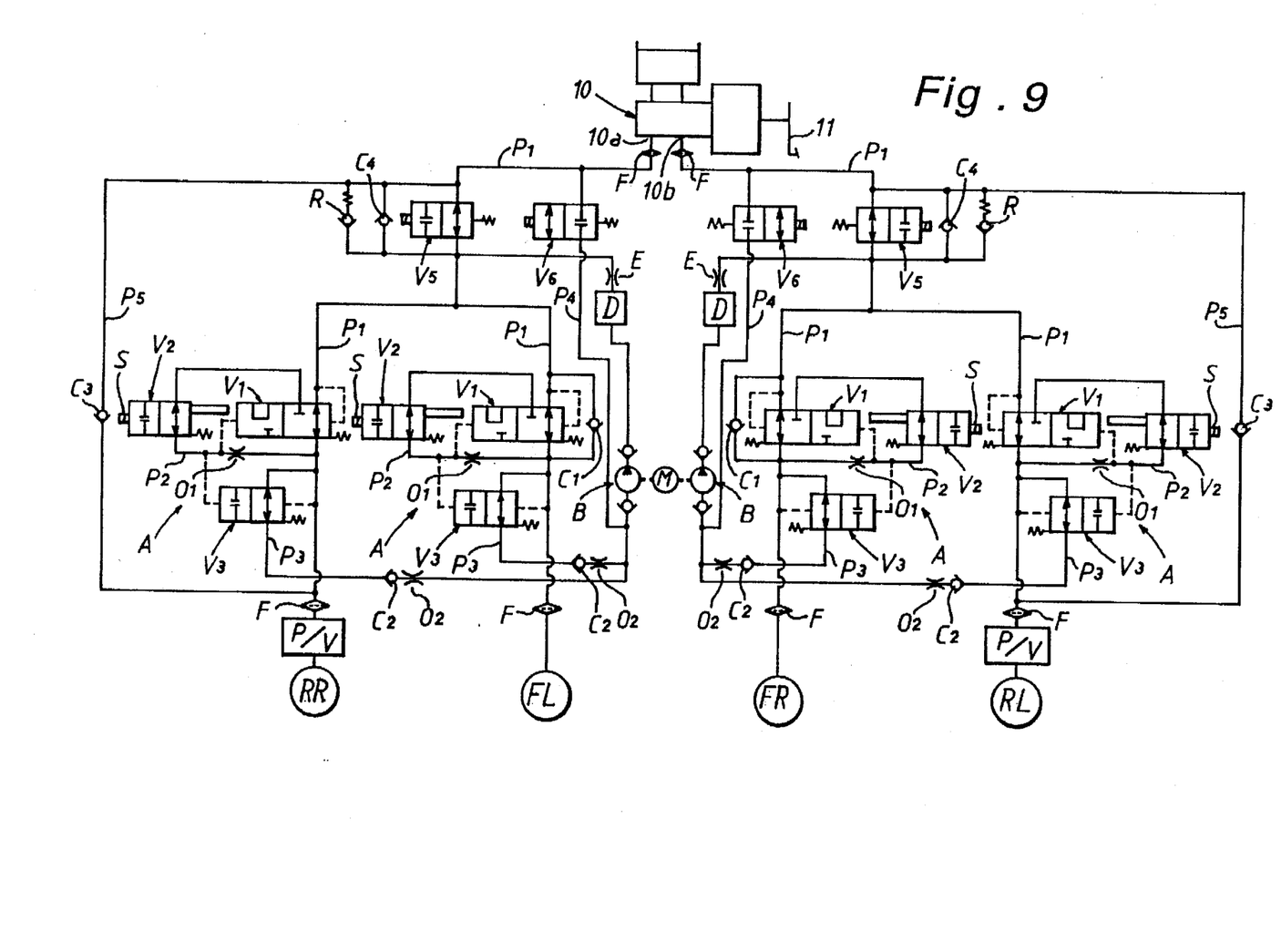

The hydraulic braking pressure control apparatus shown in FIG. 8 may be modified as shown in FIG. 9, wherein the changeover valve V4 in the respective braking systems is replaced with a fourth electrically operated on-off valve V5 disposed within the first fluid passage P1 and a fifth electrically operated on-off valve V6 disposed within the fourth fluid passage P4. In this modification, the fourth electrically operated on-off valve V5 is normally retained in an open position to be closed in the same manner as the changeover valve V4 in FIG. 8 at a traction control mode of the vehicle, and the fifth electrically operated on-off valve V6 is normally retained in a closed position to be opened at the traction control mode of the vehicle. The other construction and operation of the modified hydraulic braking pressure control apparatus are the same as those in the control apparatus shown in FIG. 8.

Figure 10:
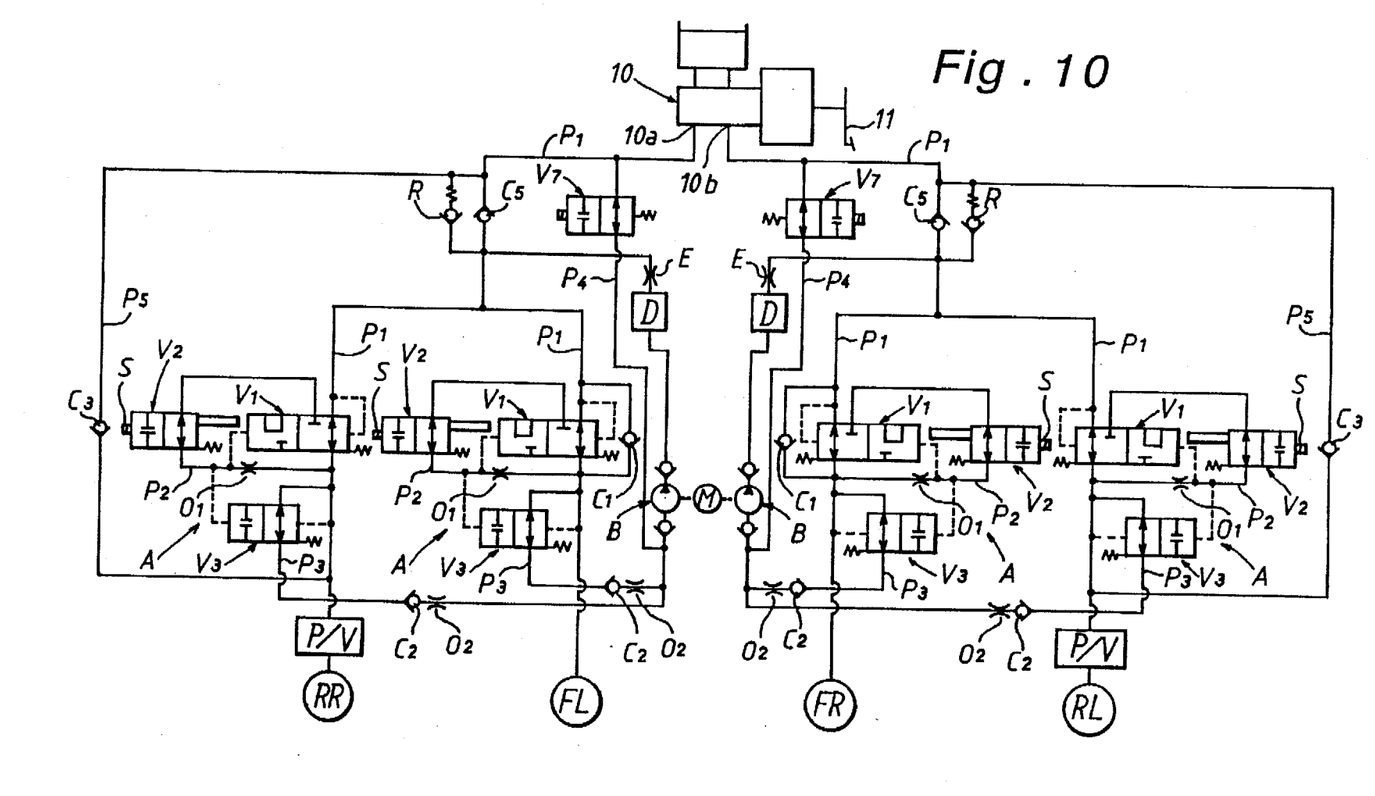

Alternatively, the hydraulic braking pressure control apparatus shown in FIG. 9 may be modified as shown in FIG. 10, wherein the fourth electrically operated on-off valve V5 is replaced with a check valve C5 which is arranged to permit the flow of hydraulic fluid from the master cylinder 10 toward the first valve V1, and wherein the fifth electrically operated on-off valve V6 of the normally closed type is replaced with an electrically operated on-off valve V7 of the normally open type which is arranged to be closed when the hydraulic pressure in the wheel brake cylinders is decreased by operation of the fluid pumps B.

What is claimed is:

1. A hydraulic braking pressure control apparatus adapted to a vehicle braking system for a set of wheel brake cylinders in an automotive vehicle, which includes an electrically operated valve assembly provided to control hydraulic braking fluid under pressure from a master cylinder to the wheel brake cylinders and an electrically operated fluid pump arranged to recirculate the hydraulic braking fluid from the wheel brake cylinders to a fluid reservoir of the master cylinder when a set of road wheels of the vehicle tend to be locked in braking operation, wherein the hydraulic braking pressure control apparatus comprises a first fluid passage connecting the master cylinder to each of the wheel brake cylinders to permit the flow of hydraulic braking fluid under pressure supplied to the respective wheel brake cylinders without causing any throttle of the braking fluid; a second fluid passage connected in parallel with said first fluid passage, said second fluid passage being provided with throttle means; and a third fluid passage connecting each of the wheel brake cylinders to said electrically operated fluid pump; and wherein said electrically operated valve assembly comprises first valve means disposed within said first fluid passage to permit the flow of hydraulic braking fluid under pressure passing therethrough when it is retained in a first position and to connect said first fluid passage to said second fluid passage when it is switched over from the first position to a second position; second valve means disposed within said second fluid passage to cooperate with said first valve means, said second valve means being normally retained in an open position in a condition where said first valve means is retained in the first position and being arranged to be closed by energization of an electromagnetic motor assembled therewith for switching over said first valve means from the first position to the second position so that said first valve means is retained in the second position by a difference in pressure between opposite sides of said throttle means when said second valve means has been opened by deenergization of said electromagnetic motor; and third valve means disposed within said third fluid passage, said third valve means being normally retained in an open position in a condition where said first valve means is retained in the first position during deactivation of said fluid pump and being arranged to be closed by the difference in pressure between the opposite sides of said throttle means when said second valve means has been opened in a condition where said first valve means is being retained in the second position during activation of said fluid pump and to be opened when said first valve means is switched over from the second position to the first position after said fluid pump has been deactivated.

2. A hydraulic braking pressure control apparatus as claimed in claim 1, wherein second throttle means is disposed in addition to, said first-named throttle means within said second fluid passage at a downstream side of said second valve means so that said first valve means is retained in the second position when a difference in pressure between opposite sides of said first named throttle means becomes larger than a first predetermined value and that said third valve means is closed when a difference in pressure between opposite sides of said second throttle means becomes a larger than a second predetermined value.

3. A hydraulic braking pressure control apparatus as claimed in claim 2, wherein said second throttle means is disposed within said second fluid passage at a downstream side of said first-named throttle means.

4. A hydraulic braking pressure control apparatus as claimed in claim 1, wherein said first, second and third valve means are coaxially disposed within a single housing body, and wherein said electromagnetic motor is mounted within said housing body coaxially with said first, second and third valve means to cooperate said second valve means with said first valve means.

5. A hydraulic braking pressure control apparatus as claimed in claim 1, wherein said first and second valve means are coaxially disposed within a first internal bore formed in a single housing body, wherein said electromagnetic motor is mounted within said housing body coaxially with said first and second valve means to cooperate said second valve means with said first valve means, and wherein said third valve means is disposed within a second internal bore formed in parallel with said first internal bore in said housing body to be closed and opened in response to on-off operation of said second valve means.

6. A hydraulic braking pressure control apparatus as claimed in claim 1, further comprising a fourth fluid passage connecting a suction side of said fluid pump to said first fluid passage between said master cylinder and said first valve means, fourth valve means disposed within said first fluid passage to disconnect said fourth fluid passage from said first fluid passage and permit the flow of hydraulic braking fluid supplied therethrough from said master cylinder toward said first valve means in braking operation when it is retained in a first position during deactivation of said fluid pump and to connect said fourth fluid passage to said first fluid passage when it is switched over from the first position to a second position under an inoperative condition of said master cylinder, and a discharge fluid passage connecting a discharge side of said fluid pump to said first fluid passage between said fourth valve means and said first valve means.

7. A hydraulic braking pressure control apparatus as claimed in claim 1, further comprising a fourth fluid passage connecting a suction side of said fluid pump to said first fluid passage between said master cylinder and said first valve means, fourth valve means disposed within said fourth fluid passage, said fourth valve means being normally retained in a closed position to interrupt the flow of hydraulic fluid passing through said fourth fluid passage in braking operation and being arranged to permit the flow of hydraulic fluid passing through said fourth fluid passage when said fluid pump is activated under an inoperative condition of said master cylinder, fifth valve means disposed within said first fluid passage between said master cylinder and said first valve means, said fifth valve means being normally retained in an open position to permit the flow of hydraulic braking fluid passing therethrough and being arranged to be closed when said fluid pump is activated under the inoperative condition of said master cylinder; and a discharge fluid passage connecting a discharge side of said fluid pump to said first fluid passage between said fifth valve means and said first valve means.

8. A hydraulic braking pressure control apparatus as claimed in claim 1, further comprising a fourth fluid passage connecting a suction side of said fluid pump to said first fluid passage between said master cylinder and said first valve means, fourth valve means disposed within said fourth fluid passage, said fourth valve means being normally retained in a closed position to interrupt the flow of hydraulic fluid passing therethrough in braking operation and being arranged to be opened when said fluid pump is activated under an inoperative condition of said master cylinder; check valve means disposed within said first fluid passage between said master cylinder and said first valve means to permit only the flow of hydraulic braking fluid under pressure supplied from said master cylinder toward said first valve means through said first fluid passage; and a discharge fluid passage connecting a discharge side of said fluid pump to said first fluid passage between said check valve and said first valve means.

* * * * *